(12) United States Patent
Monroe

(10) Patent No.: US 12,735,101 B2
(45) Date of Patent: Sep. 15, 2026

(54) ADJUSTABLE STEERING STABILIZER ASSEMBLY

(71) Applicant: Jerry A. Edwards, Portland, OR (US)

(72) Inventor: Ryan Monroe, Gresham, OR (US)

(73) Assignee: Jerry A. Edwards, Portland, OR (US)

( * ) Notice: Subject to any disclaimer, the term of this patent is extended or adjusted under 35 U.S.C. 154(b) by 0 days.

(21) Appl. No.: 18/958,119

(22) Filed: Nov. 25, 2024

(65) Prior Publication Data

US 2026/0145738 A1 May 28, 2026

(51) Int. Cl.
*B62D 7/22* (2006.01)
*B62D 65/12* (2006.01)

(52) U.S. Cl.
CPC ............. *B62D 7/228* (2013.01); *B62D 65/12* (2013.01)

(58) Field of Classification Search
CPC . B62D 7/22; B62D 7/228; B62D 6/04; B62D 65/12; B60G 21/055; B60G 21/0551; B60G 2204/128
See application file for complete search history.

(56) References Cited

U.S. PATENT DOCUMENTS 1,175,475 A * 3/1916 Schofield ................. B62D 7/22 280/89.11
2,151,850 A * 3/1939 Hedrick ................. B60G 17/08 280/90
3,848,885 A * 11/1974 Hefren ..................... B62D 7/22 280/89.11
4,359,123 A * 11/1982 Haupt .................... B62D 17/00 180/436
4,697,817 A * 10/1987 Jefferson .................. B62D 7/22 280/771
6,003,887 A 12/1999 Howard
6,817,620 B1 * 11/2004 Howard ................. B62D 7/228 280/90
8,596,659 B2 12/2013 Hudson
10,093,354 B2 10/2018 Eveley
10,577,018 B2 3/2020 Urbanski et al.
10,683,033 B2 * 6/2020 Shepherd ............... B62D 7/228
11,332,190 B1 5/2022 Shepherd

FOREIGN PATENT DOCUMENTS

| | | |
|---|---|---|
| AU | 2017339976 A1 | 3/2019 |
| CN | 116331336 A | 6/2023 |
| KR | 20210059814 A | 5/2021 |

* cited by examiner

*Primary Examiner* — James A English
(74) *Attorney, Agent, or Firm* — Erise IP, P.A.

(57) ABSTRACT

Systems and methods for providing a steering stabilizer assembly on a vehicle are disclosed. In some embodiments, the steering stabilizer may be coupled to a tie rod of a vehicle on an adjustable end and to fixed component of the vehicle on a fixed end. An adjustable bracket and a stabilizer bracket may be loosely coupled such that the adjustable bracket may move relative to the stabilizer bracket and the steering stabilizer. The vehicle may be driven along a straight path while adjusting the adjustable bracket relative to the steering stabilizer. When the steering assembly of the vehicle is configured to steer the vehicle along the straight path and the steering stabilizer is centered, the adjustable bracket may be secured to the stabilizer bracket securing the steering stabilizer to the tie rod.

20 Claims, 9 Drawing Sheets

22
28
30
32
33
34
36
38
56
58
62
64
67
68
69
76

ADJUSTABLE STEERING STABILIZER ASSEMBLY

BACKGROUND

1. Field

Embodiments of the current disclosure relate to steering stabilizers. More specifically, embodiments of the current disclosure relate to an adjustable steering stabilizer.

2. Related Art

Generally, steering stabilizers can be coupled to steering assemblies of vehicles to reduce steering vibration and improve handling and driver control. Typical steering stabilizers are coupled to the vehicle steering assembly at a tie rod at one end then coupled to a fixed point of the vehicle at the other end. Between the tie rod and the fixed point, the steering stabilizer provides a dampener to absorb the energy of perturbations in the steering assembly. Absorption of the perturbation energy results in less vibrations and road noise translated to the driver and more control of the steering of the vehicle provided to the driver. However, there are drawbacks to steering stabilizers.

Installing steering stabilizers typically involves some level of trial and error. For a steering stabilizer to operate properly, the steering stabilizer must be installed correctly. Typical steering stabilizers must be installed at a neutral point where the steering stabilizer does not significantly push or pull on the tie rod. Force added to the tie rod by the steering stabilizer can force the steering assembly to not be centered forcing the vehicle to steer one way or the other without input from the driver if the steering stabilizer is not centered. Therefore, much care must be taken in installing steering stabilizers in a centered location, where no force is imparted on the tie rod by the steering stabilizer or any force is applied in equal and opposite directions. Typical steering stabilizers are mounted to the vehicle steering assembly, then the vehicle is driven to test the location of the steering stabilizer. If the vehicle pulls one way or the other, the steering stabilizer is not centered. The typical process for correcting the issue is to remove the coupling between the steering stabilizer and the tie rod, move it over slightly, reattach the coupling, and drive the vehicle again. This process is then repeated by trial and error until the vehicle drives in a straight line. This is a cumbersome, time-consuming process.

What is needed are systems and methods of installing an adjustable steering stabilizer assembly that does not need to be decoupled from the vehicle for adjustment. Furthermore, what is needed are systems and methods of adjusting the steering stabilizer to the centered position while the vehicle is driving the straight line.

SUMMARY

Embodiments of the current disclosure solve the above-described problems and provide a distinct advance in the art by providing an adjustable steering stabilizing system that can be adjusted while a vehicle is moving.

An embodiment of the current disclosure comprises a method of installing a steering stabilizer assembly on a vehicle. The method comprises coupling a fixed bracket to a fixed component of the vehicle, coupling an adjustable bracket to a tie rod of the vehicle, wherein the adjustable bracket is coupled to a stabilizer bracket by stabilizer fasteners, providing a steering stabilizer between the stabilizer bracket and the fixed bracket, wherein the steering stabilizer comprises one or more shock absorbers configured to absorb energy from the vehicle, adjusting the adjustable bracket relative to the stabilizer bracket by moving the tie rod and allowing the stabilizer fasteners to move in fastener slots while the vehicle is in motion, and tightening the stabilizer fasteners when a steering assembly of the vehicle is in a steering center position that steers the vehicle in a substantially straight path and the steering stabilizer is in a stabilizer center position.

An embodiment of the current disclosure comprises a steering stabilizer assembly. The steering stabilizer assembly comprises an adjustable bracket coupled to a tie rod of a vehicle, wherein the adjustable bracket comprises fastener slots configured to receive fasteners, a fixed bracket coupled to a fixed component of the vehicle, a steering stabilizer comprising one or more shock absorbers configured to absorb energy imparted to the steering stabilizer by the vehicle, a stabilizer bracket positioned between the steering stabilizer and the adjustable bracket, stabilizer fasteners disposed in the fastener slots coupling the stabilizer bracket to the adjustable bracket, wherein the adjustable bracket is configured to move relative to the stabilizer bracket by moving the tie rod and allowing the stabilizer fasteners to move in the fastener slots, and wherein the stabilizer fasteners are configured to be tightened, locking the adjustable bracket and the stabilizer bracket together when the tie rod is in a steering center position that steers the vehicle in a substantially straight path and the steering stabilizer is in a stabilizer center position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 5:
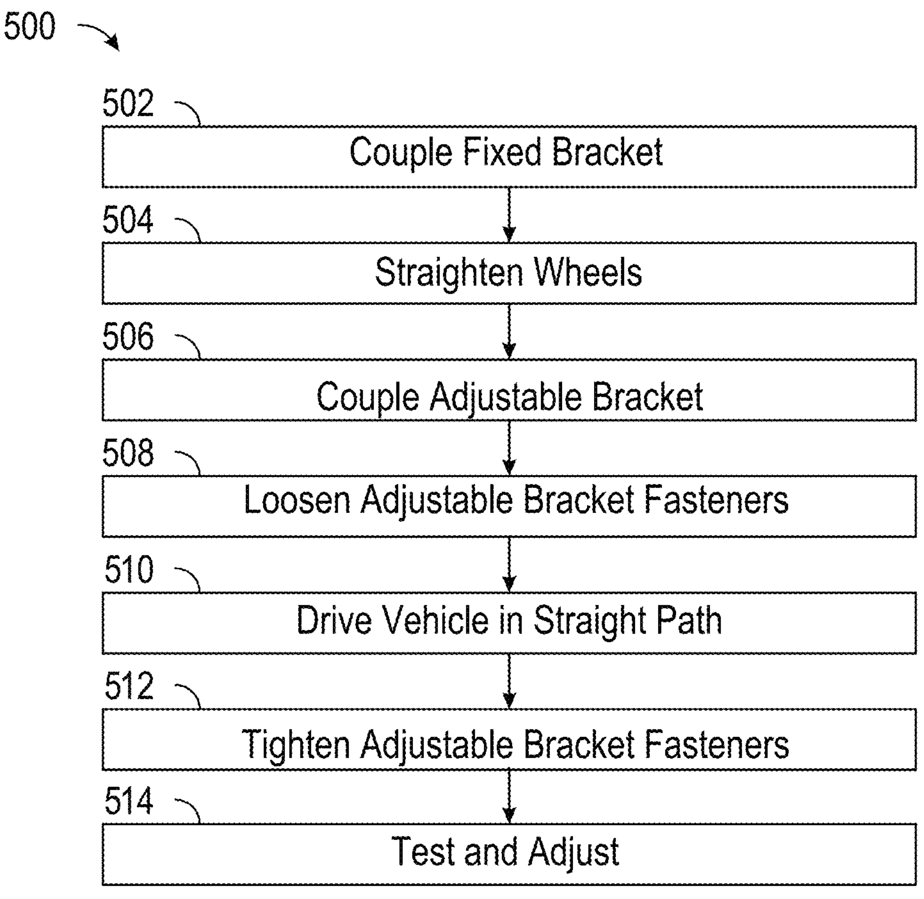

FIG. 5 presents a process of installing the adjustable steering stabilizer assembly on the vehicle.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure provide an adjustable steering stabilizer assembly. The adjustable steering stabilizer assembly may be coupled on an adjustable end to a steering tie rod of a steering assembly of a vehicle. The adjustable steering stabilizer assembly may be coupled on a fixed end to a frame, a front axle, or other fixed component of the vehicle providing a stable and secure contact point. In some embodiments, the adjustable steering stabilizer assembly comprises an adjustable bracket, a steering stabilizer, and a fixed bracket as well as other components and subcomponents. The adjustable bracket may be positioned between the tie rod of the vehicle and the steering stabilizer and may be adjustable to allow the vehicle wheels to straighten while the steering stabilizer assembly is coupled to the vehicle. In some embodiments, the adjustable bracket may be secured to the tie rod and the steering stabilizer by bolts running through slots. The bolts may be loose allowing the bolts to slide back and forth within the slots. As the tie rod moves as the wheels move left to right, the steering stabilizer may not move (e.g., remain in a centered position). As such, the tie rod may move relative to the steering stabilizer. Therefore, the steering stabilizer may be secured to the vehicle at the tie rod and a second fixed location but still may be adjusted while the vehicle drives in a straight line to verify that the wheels are straight. Once it is determined that the wheels are straight, the bolts can be tightened to secure the steering stabilizer to the steering tie rod at a position that aligns the center position of the steering stabilizer with a center position of the vehicle steering assembly. Therefore, the steering stabilizer may provide no force, or a centering force, to the tie rod when the steering assembly is aligned to drive the vehicle in a straight line.

Figure 1:
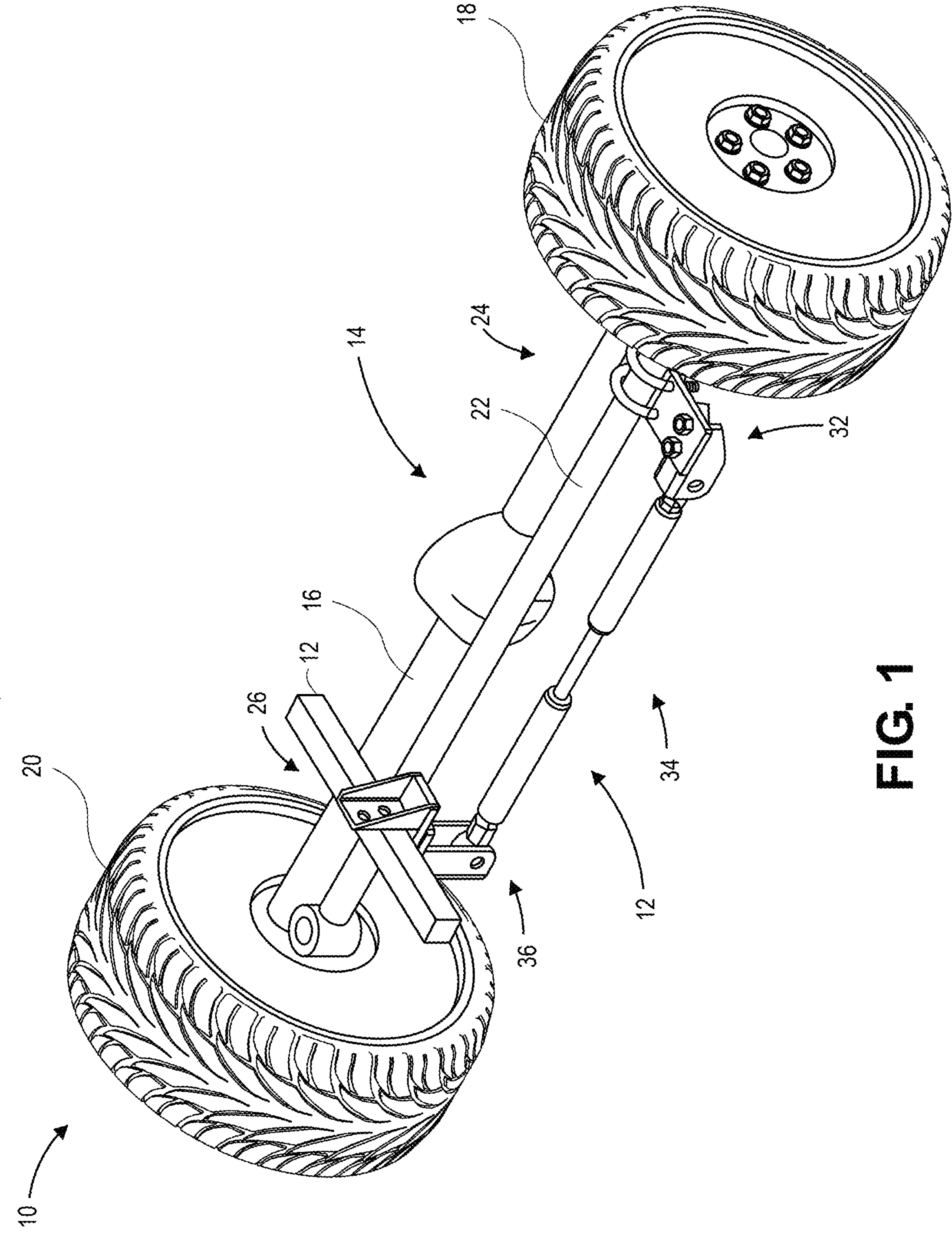
FIG. 1 depicts an embodiment of steering stabilizer installed on a vehicle.
Figure 4B:
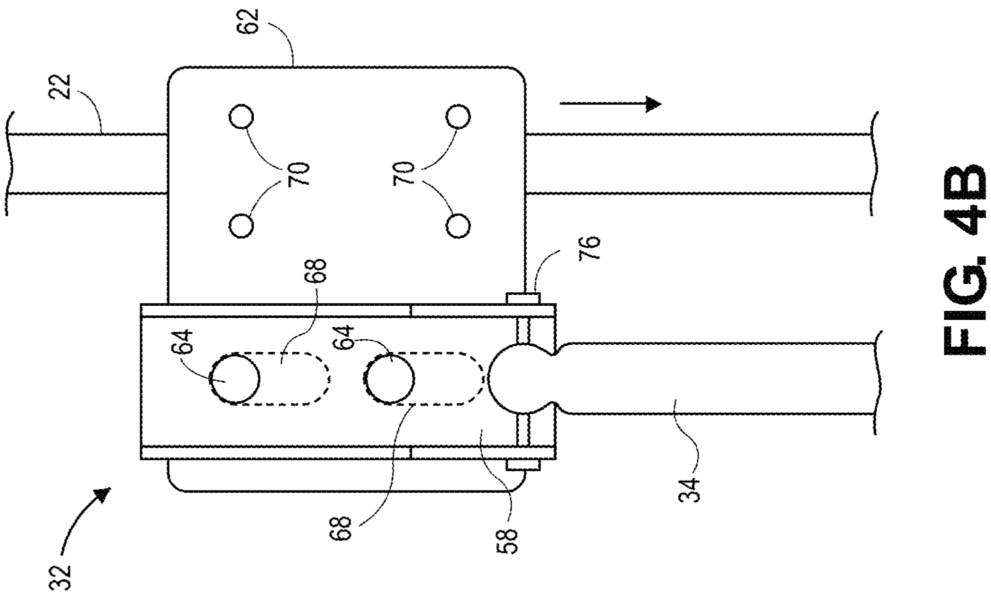
FIGS. 4A-4B depict the adjustable bracket with steering stabilizer adjustments.
Figure 4A:
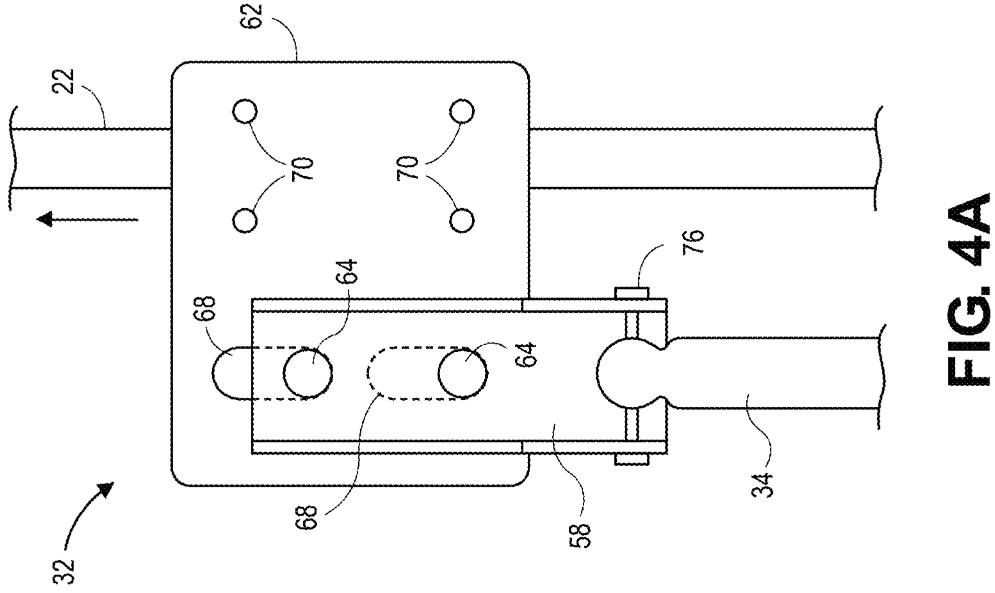
Figure 4C:
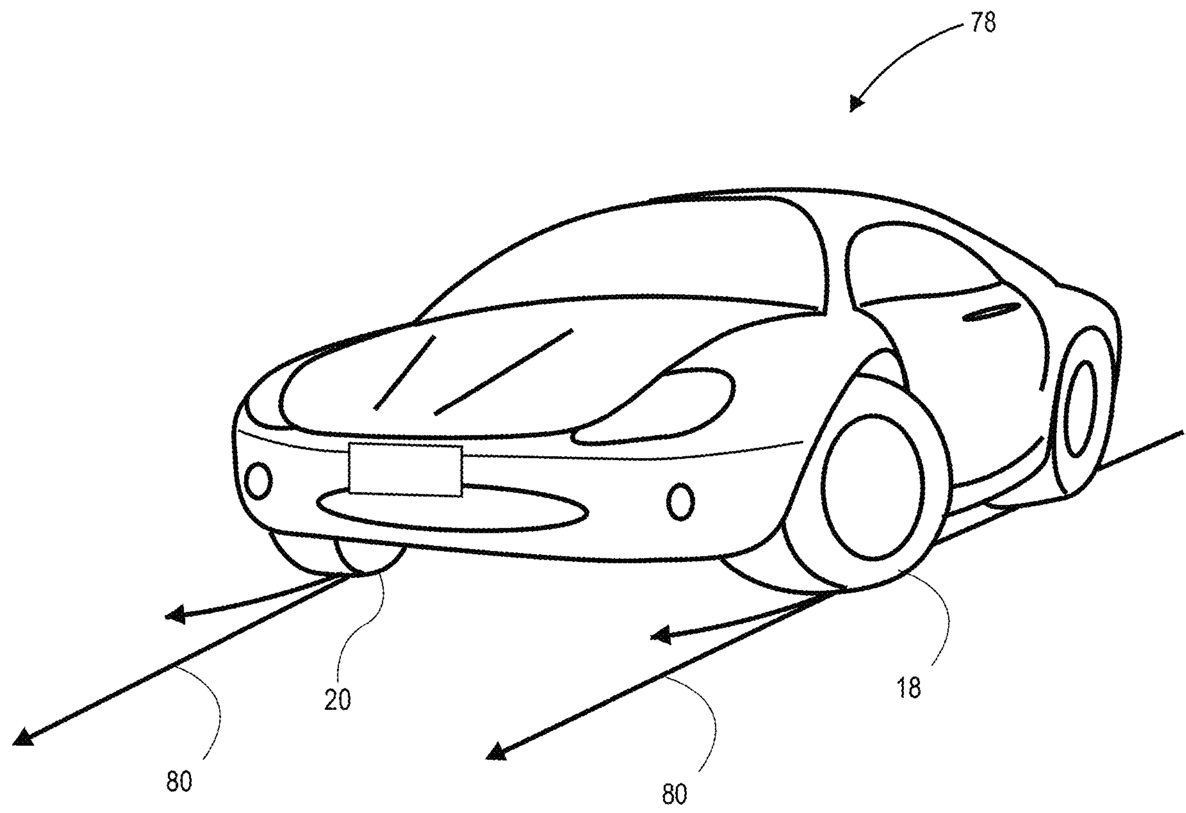
FIG. 4C depicts a vehicle steering effect.

FIG. 1 depicts an exemplary embodiment of adjustable steering stabilizer assembly 10 coupled to tie rod 22 of a steering assembly 14 of vehicle 78 (shown in FIG. 4C). In some embodiments, steering assembly 14 comprises wheels 18, 20 comprising driver wheel 18 of a driver side and passenger wheel 20 of a passenger side of vehicle 78 as well as any other components and subcomponents necessary for steering vehicle 78. Furthermore, driver wheel 18 and passenger wheel 20 may be connected by axle 16 and tie rod 22. Driver wheel 18 may be connected at axle proximal end, or adjustable end 24, proximate the coupling of adjustable steering stabilizer assembly 10 to tie rod 22 and passenger wheel 20 may be coupled to axle 16 at axle distal end, or fixed end 26.

In some embodiments, adjustable steering stabilizer assembly 10 comprises adjustable bracket assembly 32, steering stabilizer 34, and fixed bracket assembly 36. Adjustable bracket assembly 32 may be coupled to tie rod 22 of the vehicle 78 and to steering stabilizer 34. Adjustable bracket assembly 32 may be coupled to tie rod 22 at adjustable end 24 of adjustable steering stabilizer assembly 10. Adjustable bracket assembly 32 may be adjustable to secure steering stabilizer 34 in a neutral, or centered, position. The centered position may be a configuration of the steering stabilizer 34 where any forces imparted on tie rod 22 cancel or are non-existent when the steering assembly 14 is straight. The centered position of adjustable steering stabilizer assembly 10 and steering assembly 14 is described in more detail below. Furthermore, steering stabilizer 34 may be coupled to fixed bracket assembly 36 at fixed end 26 of adjustable steering stabilizer assembly 10, and fixed bracket assembly 36 may be coupled to fixed component 12 of vehicle 78.

Figure 2A:
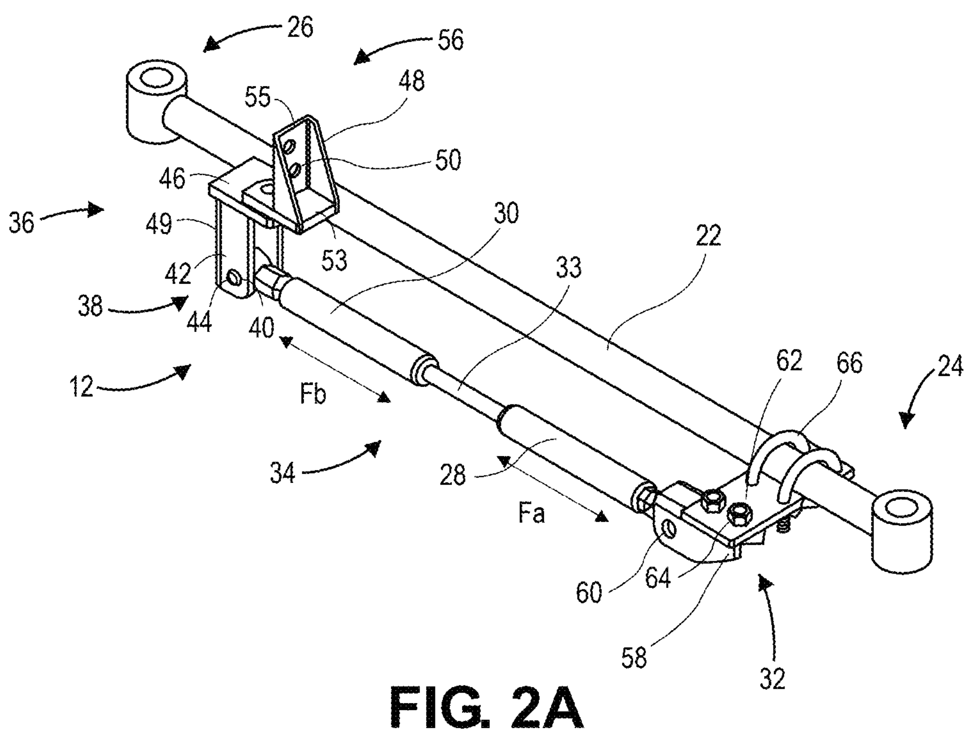
FIGS. 2A-2E depict steering stabilizer for some embodiments.
Figure 2B:
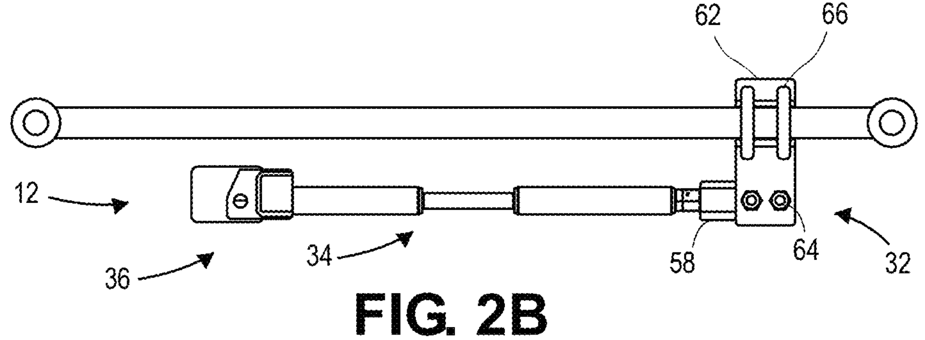
Figure 2C:
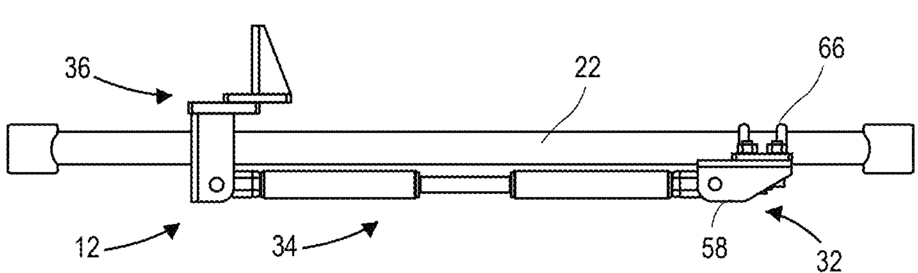

Turning to FIGS. 2A-2C depicting adjustable steering stabilizer assembly 10, steering stabilizer 34 may comprise first shock absorber 28 and second shock absorber 30 connected by stabilizer rod 33. Shock absorption may be provided to steering assembly 14 by first shock absorber 28 and second shock absorber 30 absorbing energy from tie rod 22. Furthermore, steering stabilizer 34 may be coupled to fixed bracket assembly 36, which may be coupled to fixed component 12 of vehicle 78 such as, for example, a frame or axle 16 providing stability to fixed end 26 of steering stabilizer 34.

Adjustable steering stabilizer assembly 10 may enable steering assembly 14 to counteract perturbation forces from various interferences encountered when driving, such as potholes, uneven pavement, off-road obstacles, a blown tire, sudden wind gusts, etc., which would otherwise force vehicle 78 to deviate from the driver's desired straight-ahead trajectory (as shown in FIG. 4C). Adjustable steering stabilizer assembly 10 may be configured to correct the steering of vehicle 78 under such circumstances by providing a force that returns steering assembly 14 to the driver's desired path, such as along a straightaway, by providing a return-to-center force. In some embodiments, first shock absorber 28 and second shock absorber 30 may be configured and arranged to provide a pre-loaded force, such that a pulling force and/or a pushing force begins with any displacement from the "centered" position. In some embodiments, the pre-load force is equal and opposite resulting in equilibrium of adjustable steering stabilizer assembly 10. Furthermore, first shock absorber 28 may be configured as a gas pull-type spring (e.g., gas traction spring) and second shock absorber 30 may be configured as a gas push-type spring or vice versa. In some embodiments, there is no force in steering stabilizer 34 at the centered position. The goal is to have steering stabilizer 34 coupled to tie rod 22 when the steering stabilizer 34 is in the centered position and the steering assembly 14 is aligned and driving vehicle 78 in a straight path. As such, any deviation from the straight path of vehicle 78 will be corrected by steering stabilizer 34 providing a restoring force provided by Fa and/or Fb as shown in FIG. 2A. Therefore, adjustable steering stabilizer assembly 10 may provide resistance to tie rod 22 during any steering away from straight and damping any vibrations and instability.

Continuing with the embodiments depicted in FIGS. 2A-2C, adjustable steering stabilizer assembly 10 is shown in a perspective view (FIG. 2A), a top view (FIG. 2B), and a side view (FIG. 2C). In some embodiments, adjustable bracket assembly 32 may be secured to tie rod 22 by tie rod fasteners 66. Here, tie rod fasteners 66 are shown as U-bolts; however, tie rod fasteners 66 may be any bolts, screws, clamps, or any other fastening mechanism. Furthermore, tie rod fasteners 66 may be selectively attachable such that adjustable bracket assembly 32 may be positioned anywhere along the length of tie rod 22. Here, the position of adjustable bracket assembly 32 along the length of tie rod 22 is based on the length of steering stabilizer 34 and the attachment point of fixed bracket assembly 36 on vehicle 78. Furthermore, the position of adjustable bracket assembly may further be based on the pre-loaded force in first shock absorber 28 and second shock absorber 30. As described above, fixed bracket assembly 36 may be attached to the frame of vehicle 78, the axle, or any other fixed component 12 that may support the load provided by steering stabilizer 34 under load. As such, when wheels 18, 20 of vehicle 78 are straight, or somewhat straight as described below, tie rod fasteners 66 may be tightened to secure adjustable steering stabilizer assembly 10 to tie rod 22. In some embodiments, further fine tuning of adjustable steering stabilizer assembly 10 may be required as described below.

At fixed end 26 of steering stabilizer 34, fixed bracket assembly 36 may be secured to fixed component 12 of vehicle 78. Fixed component 12 of vehicle 78 may be the frame or axle of vehicle 78 or any other component that may provide the proper stability to receive the load (e.g., Fa and Fb) from for adjustable steering stabilizer assembly 10, which in some embodiments, may be transferred from vehicle 78. Fixed bracket assembly 36 may be configured to couple fixed end 26 of steering stabilizer 34 to vehicle 78. Fixed bracket assembly 36 may be coupled to steering stabilizer 34 by fixed end couplers 44, which, in this scenario, is a rod, bolt, pin, or the like configured to allow steering stabilizer 34 to rotate about a longitudinal axis (transverse to the length of steering stabilizer 34) of fixed end couplers 44. Though fixed end couplers 44 are not shown in detail herein, fixed end couplers 44 may be the same or similar component and may function the same or similar to other fasteners (e.g., bolts, screws, clamps, and the like) shown and described in detail below. Specifically, fixed end couplers 44 may function similarly to stabilizer fasteners 76 (FIGS. 4A and 4B) described in detail below.

In some embodiments, fixed bracket assembly 36 comprises lower fixed bracket 38 and upper fixed bracket 56. Here, lower fixed bracket 38 comprises vertical side plates 42 configured with side plate holes 40 for fixed end couplers 44 to be provided therethrough. Side plate holes 40 may be configured to receive fixed end couplers 44 and allow rotation of fixed end couplers 44 and steering stabilizer 34. In some embodiments, the rotation of steering stabilizer 34 is provided by the interaction between fixed end couplers 44 and steering stabilizer fixed end 26 providing a through hole at side plate holes 40 for receive fixed end couplers 44 therethrough. Fixed end couplers 44 may provide a pivot axis of rotation to steering stabilizer 34 while providing a longitudinally stable resistance to steering that allows steering stabilizer 34 to push and pull against the steering forces by providing stabilizing forces Fa and Fb. Furthermore, lower fixed bracket 38 may further comprise lower fixed bracket back plate 49 coupled to (e.g., welded) or integrally form with vertical side plates 42. Lower fixed bracket back plate 49 may be configured to provide structural support for receiving the forces translated from tie rod 22 through steering stabilizer 34 and into fixed bracket assembly 36.

In some embodiments, lower fixed bracket 38 comprises lower fixed bracket top plate 46 configured to provide structure and couple lower fixed bracket 38 to upper fixed bracket 56. Lower fixed bracket top plate 46, in some embodiments, may be coupled to upper fixed bracket 56 by a top plate fastener such as, for example, a bolt, or may be coupled by welding.

In some embodiments, upper fixed bracket 56 comprises upper fixed bracket bottom plate 53 configured to couple to lower fixed bracket top plate 46, upper fixed bracket side plates 48, and upper fixed bracket back plate 55. Upper fixed bracket side plates 48 may be any shape and provide structural support and are shown as triangular in FIGS. 2A-2C. Upper fixed bracket back plate 55 may be configured to couple to fixed component 12 of vehicle 78. Upper fixed bracket back plate 55 may comprise one or more back holes 50 configured to receive fixed plate fasteners (not shown) to couple to vehicle 78. Fixed plate fasteners may be bolts, screws, clamps, or any other type of fasteners and may provide secure coupling between vehicle 78 and adjustable steering stabilizer assembly 10. In some embodiments, fixed plate fasteners may be U-bolts, such as, tie rod fasteners 66 for securing to fixed component 12.

Figures 2D, 2E:
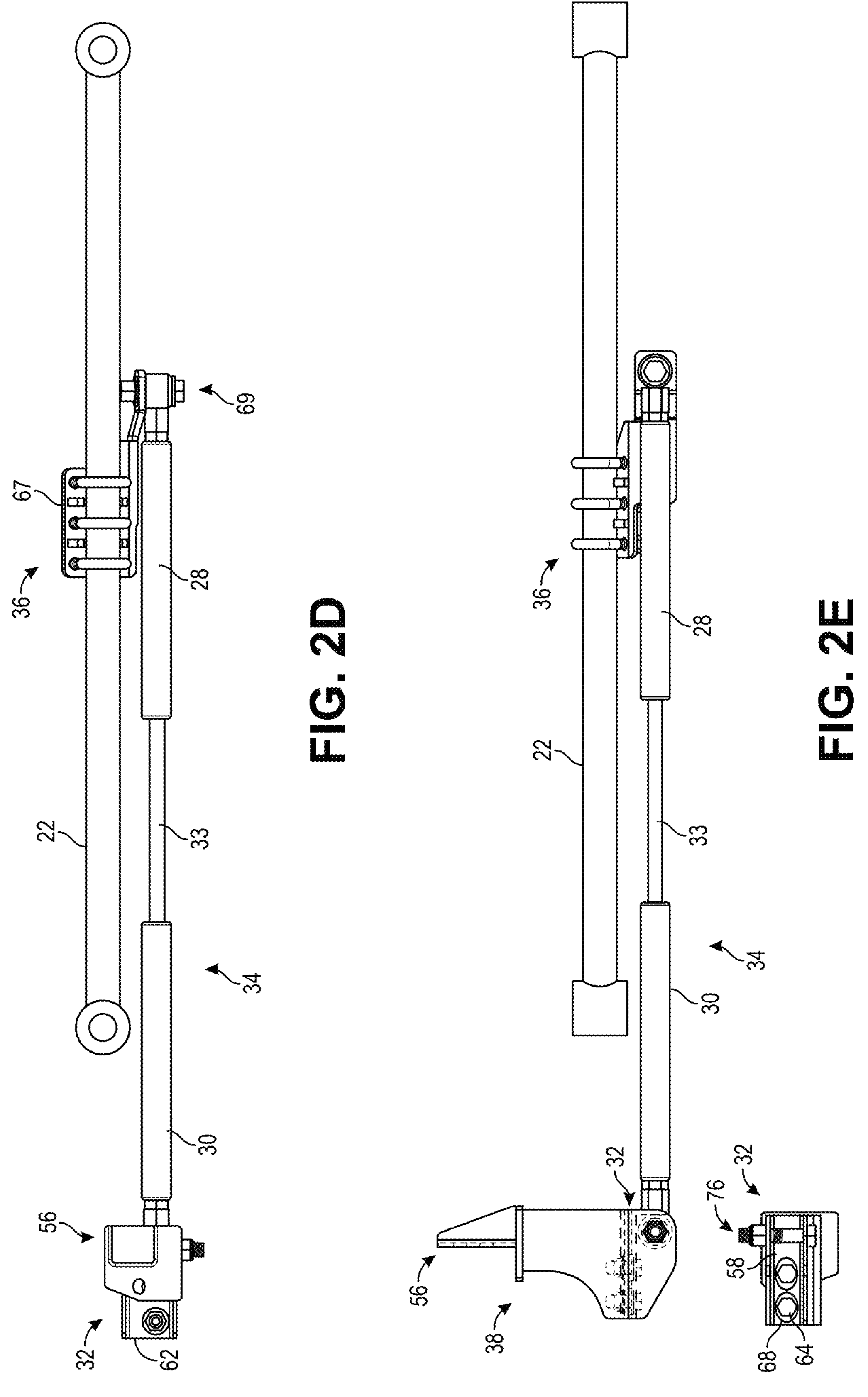

FIGS. 2D-2E depict an embodiment of adjustable steering stabilizer assembly 10 where adjustable bracket assembly 32 is on a fixed component side and fixed bracket assembly 36 is on a tie rod side. Here, fixed bracket assembly 36 comprises fixed tie rod plate 67 comprising various fasteners (e.g., U-bolts) configured to secure fixed tie rod plate 67 to tie rod 22. Fixed bracket assembly 36 may be fixed to tie rod 22 before the fine tune adjustments described herein. Furthermore, adjustable bracket assembly 32 may be coupled to lower fixed bracket 38, and upper fixed bracket 56 may be coupled to fixed component 12 if vehicle 78 when wheels 18, 20 are straight. In this configuration, stabilizer fasteners 64 may be secured onto stabilizer bracket 58 but loose such that stabilizer bracket 58 may be free to move within the range provided by slots adjustable slots 68. Therefore, steering stabilizer assembly 10 can be secured between tie rod 22 and fixe component 12 while still being allowed to move while vehicle 78 is driven along a straight line for fine tuning steering stabilizer assembly 10.

Once steering stabilizer assembly 10 is secured between tie rod 22 and fixed component 12, vehicle 78 may be driven in a straight line while adjustable bracket assembly 32 moves provided by adjustable slots 68. When wheels 18, 20 are determined to be straight, stabilizer fasteners 64 may be tightened down securing steering stabilizer assembly 10 in the neutral position while wheels 18, 20 are straight. Here, the process for securing steering stabilizer assembly 10 to vehicle 78 in the neutral position is the same as described in embodiments herein, only components of the adjustable bracket assembly 32 and components of fixed bracket assembly 36 have switched places relative to FIGS. 2A-2C. Furthermore, rotational actuator 69 may be provided as part of fixed assembly 36 to allow for movement of steering stabilizer 34 relative to tie rod 22 similarly to stabilizer fasteners 76 described below.

Figure 2F:
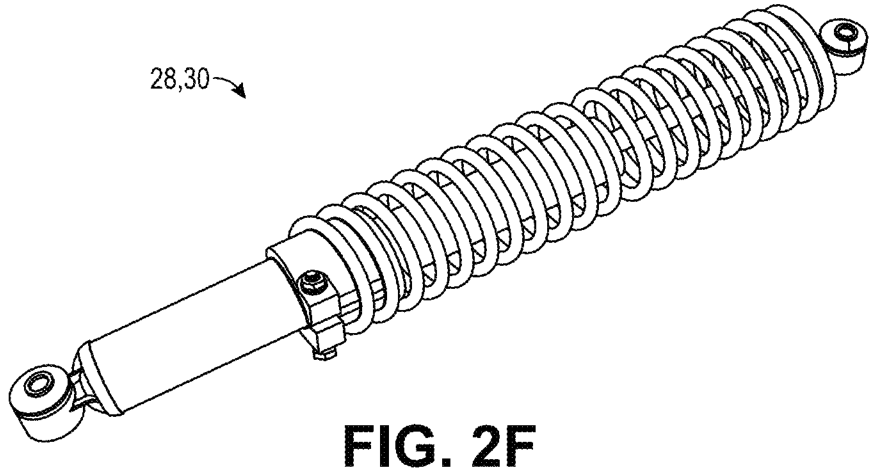
FIGS. 2F-2G depict embodiments of shock absorbers.
Figure 2G:
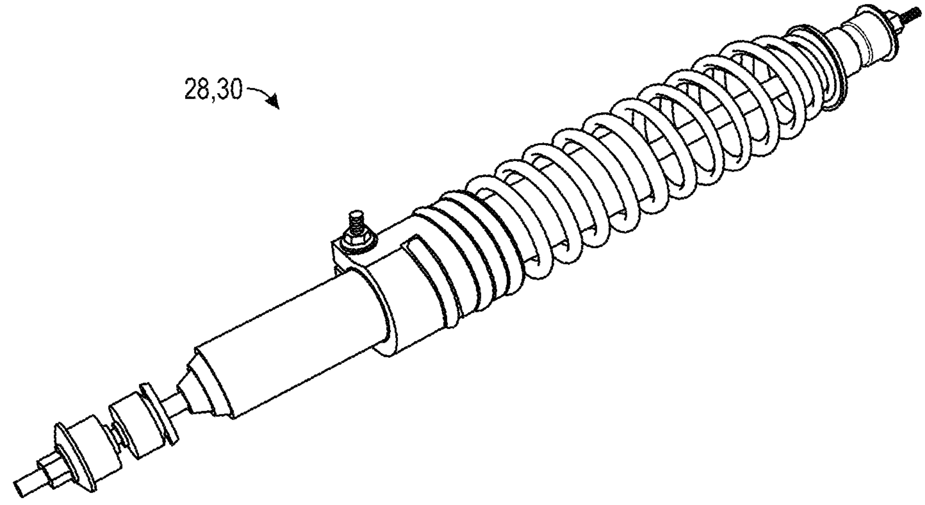

FIGS. 2F-2G depict embodiments, of shock absorbers 28, 30. As described above, shock absorbers 28, 30 may be dampeners and/or gas pull-type spring (e.g., gas traction spring). However, shock absorbers 28, 30 may be any type including springs as shown in FIGS. 2F-2G. In some embodiments, shock absorbers 28, 30 may be any type of push/pull configuration that includes gas absorbers/dampeners, gas struts, internal/external springs, and the like, as well as any combination thereof.

Figure 3A:
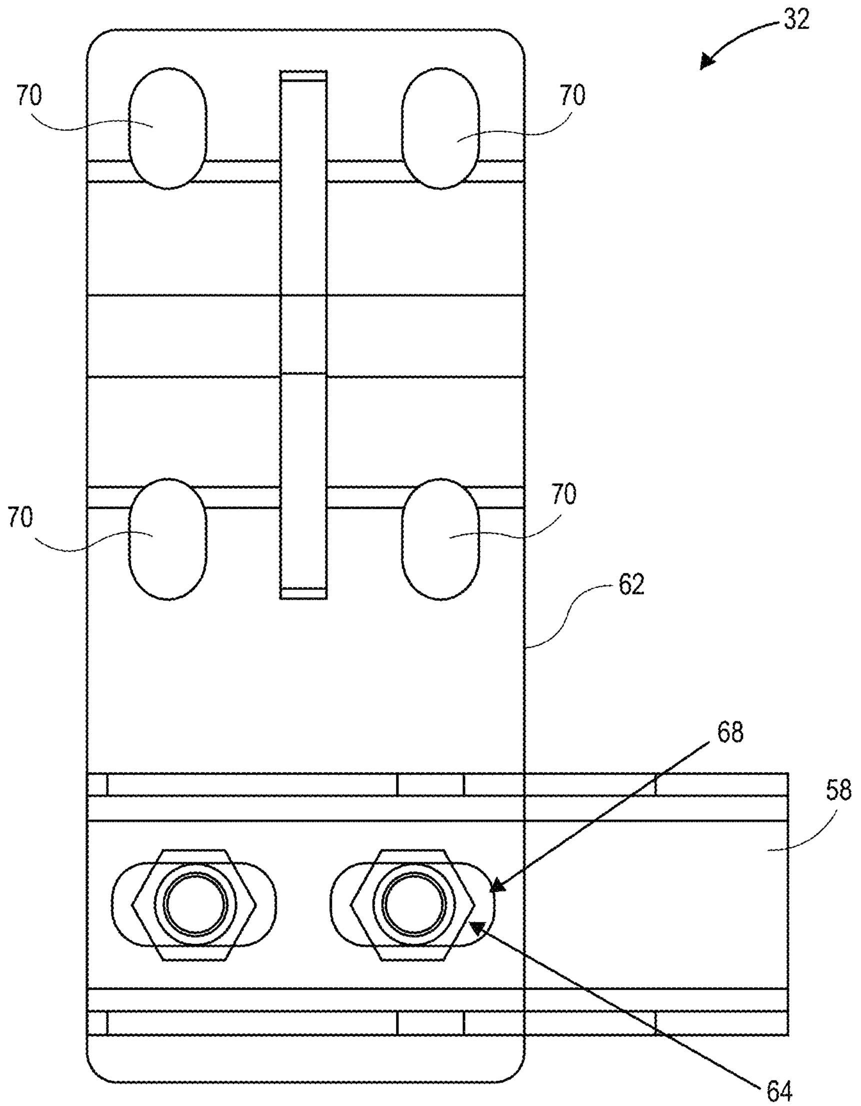
FIGS. 3A-3B depict close-up views of an adjustable bracket assembly.
Figure 3B:
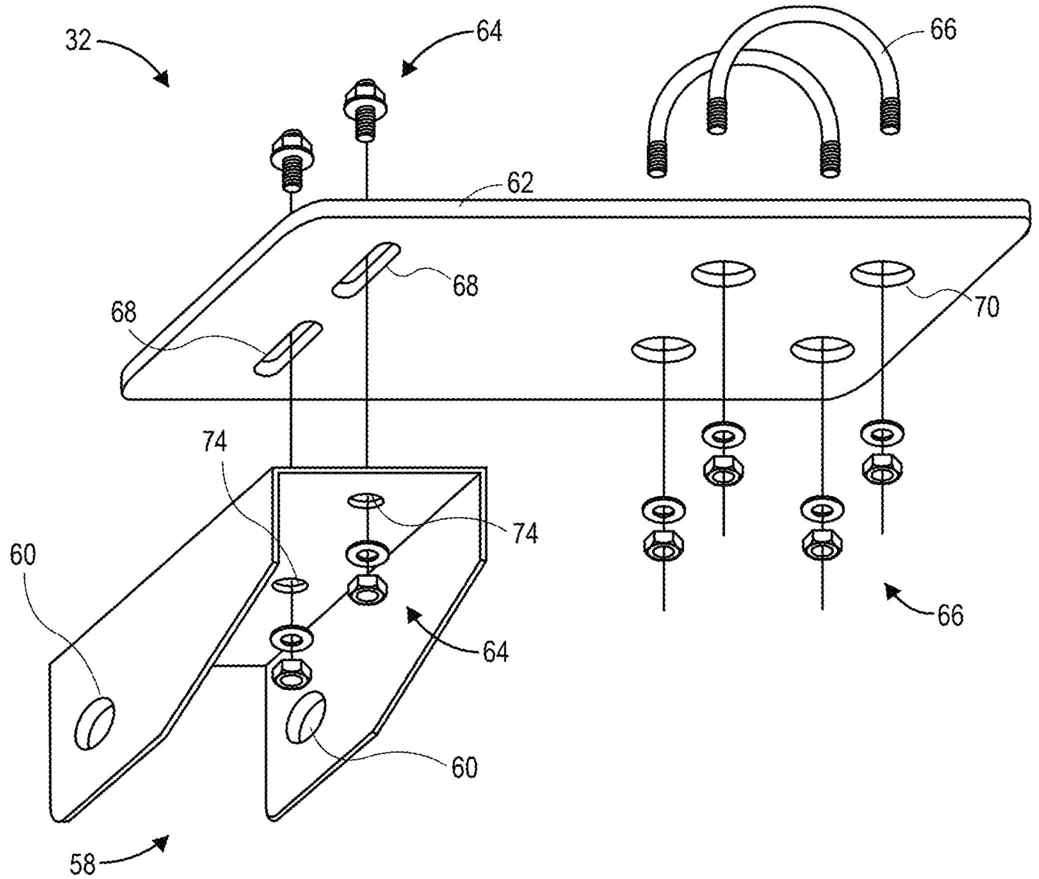

FIGS. 3A-3B depict an embodiment of adjustable bracket assembly 32. FIG. 3A depicts a close-up view of adjustable bracket assembly 32. Adjustable bracket assembly 32, in some embodiments, comprises adjustable bracket 62 and stabilizer bracket 58 as well as various hardware and fasteners. In some embodiments, adjustable bracket 62 comprising tie rod fastener holes 70 configured to receive tie rod fasteners 66 and adjustable slots 68 configured to receive stabilizer fasteners 64. Here, tie rod fastener holes 70 are depicted as being elongated slots rather than circular holes or any other shape; however, tie rod fastener holes 70 are depicted as circular holes in FIG. 3B. Tie rod fastener holes 70 may be slots, circular holes, or any other shape in embodiments herein. The elongated slots may provide adjustability along the slot providing adjustability for adjustable bracket assembly 32 relative to tie rod 22. The adjustability provided by tie rod fastener holes 70 may provide some tolerance between the position of adjustable bracket assembly 32 coupled to tie rod 22 and the position where fixed bracket assembly 36 is coupled to the fixed component 12. When an appropriate position of the frame or axle is found such that no or minimal force is applied to steering stabilizer 34, tie rod fasteners 66 may be cinched down to lock adjustable bracket assembly 32 into place along the length of tie rod 22. Here, wheels 18, 20 should be as straight as possible when the positions of fixed bracket assembly 36 and adjustable bracket assembly 32 are secured, however, more adjusting may be required as described below.

FIG. 3B depicts an exemplary exploded view of adjustable bracket assembly 32. In some embodiments, tie rod fasteners 66 may be inserted into tie rod fastener holes 70. Here, tie rod fasteners 66 are depicted as U-bolts; however, tie rod fasteners 66 may be any bolts, screws, brackets, or the like, and configured for securing adjustable bracket assembly 32 to tie rod 22. Tie rod fasteners 66 may be tightened to secure tie rod fasteners 66 through adjustable bracket 62 while coupling adjustable bracket 62 to tie rod 22.

Adjustable bracket 62 may be coupled to stabilizer bracket 58. Furthermore, stabilizer bracket 58 may comprise stabilizer holes 60 configured to receive stabilizer fasteners 76, and the stabilizer fasteners 76 may be configured to couple stabilizer bracket 58 to steering stabilizer 34 as shown in FIGS. 4A and 4B. In some embodiments, stabilizer fasteners 76 may be any fastener that couples steering stabilizer 34 to stabilizer bracket 58 for example, bolts, pins, screws, clamps, and the like. Here, stabilizer fasteners 76 are depicted as a pin such that longitudinal and lateral loads may be received by the pin, but steering stabilizer 34 may also be allowed to rotate about a longitudinal axis of the pin as shown in FIGS. 4A and 4B. As tie rod 22 moves with the steering of vehicle 78, steering stabilizer 34 may compress and extended based on the force and steering direction, and, in some embodiments, may rotate slightly about stabilizer fastener 76 and fixed end couplers 44 as described above. Furthermore, as described above, fixed end couplers 44 may comprise the same or a similar arrangement as shown in FIGS. 4A and 4B by stabilizer fastener 76.

As described above, adjustable bracket 62 may provide adjustment at the coupling point with stabilizer bracket 58 through adjustable slots 68 and stabilizer adjustable holes 74. In some embodiments, adjustable holes 74 may provide slots similar to adjustable slots 68. Providing slots at 74 instead of at 68 may functionally provide the same or similar benefit of adjustability to adjustable bracket 62. As such, providing slots at 74 and/or at 68 may providing adjustment of adjustable bracket assembly 32 as described herein.

Adjustable bracket 62 may extend laterally relative to tie rod 22 providing space to couple stabilizer bracket 58. Furthermore, adjustable bracket 62 may comprise adjustable slots 68 configured to receive stabilizer fasteners 64 configured to couple stabilizer bracket 58 to adjustable bracket 62. Adjustable slots 68 may be configured longitudinally (e.g., approximately parallel, or parallel) to the longitudinal axis of steering stabilizer 34 and tie rod 22 as shown in FIGS. 2A-2C, FIG. 3A, and FIGS. 4A and 4B. Adjustable slots 68 may be configured to allow adjustable stabilizer fasteners 64 (e.g., bolts) to slide within the slots, providing adjustment to steering stabilizer 34 along the length of tie rod 22 while adjustable bracket 62 is coupled to tie rod 22 and fixed bracket assembly 36 is coupled to vehicle 78. As such, for small adjustments to adjustable steering stabilizer assembly 10 relative to tie rod 22, adjustable steering stabilizer assembly 10 does not need to be decoupled from vehicle 78. Accordingly, adjustable steering stabilizer assembly 10 may remain coupled to tie rod 22 and fixed component 12 while fine tuning the adjustment between adjustable bracket 62 and stabilizer bracket 58.

Adjustable slots 68 are provided to allow steering stabilizer 34 to be adjusted to the center position while wheels 18, 20 are adjusted to center (i.e., straight path 80, FIG. 4C) without decoupling any of the fasteners coupling fixed bracket assembly 36 and adjustable bracket assembly 32 to vehicle 78. Providing an adjustment on adjustable steering stabilizer assembly 10 allows any operator of vehicle 78 to adjust adjustable steering stabilizer assembly 10 to the correct center position without removing any components of adjustable steering stabilizer assembly 10. Here, to adjust steering stabilizer 34 to the centered position, all couplers may be secured except stabilizer fasteners 64. Stabilizer fasteners 64 may be installed through adjustable slots 68 but not tightened resulting in a loose configuration. For the loose configuration, stabilizer fasteners 64 may be slightly modified from typical fasteners used for similar purposes. As shown in FIGS. 3A and 3B stabilizer fasteners 64 are bolts. The bolts may be, in some embodiments, an extra ¼, ½, ¾, 1 inch or any other length beyond the typical length for bolts of this purpose. The bolts may be extra long to provide space for the nuts and washers to be securely attached to the bolt while allowing the bolts to slide along adjustable slots 68 while vehicle 78 is in motion. Therefore, while vehicle 78 is in motion, adjustable steering stabilizer assembly 10 may be secured to tie rod 22 by adjustable bracket assembly 32 and at fixed component 12 of vehicle 78 by fixed bracket assembly 36. While adjustable bracket assembly 32 and fixed bracket assembly 36 are secured to the vehicle 78, steering stabilizer 34 remains adjustable because adjustable bracket 62 is fixed to tie rod 22 but adjustable relative to stabilizer bracket 58.

Utilizing the features described above, adjustable steering stabilizer assembly 10 can be adjusted while secured to vehicle 78. For example, fixed bracket assembly 36 may be attached to vehicle 78 at fixed component 12, which may be the frame or the axle 16 of vehicle 78. As shown in FIG. 4C, after the wheels 18, 20 have been straightened as closely as possible before driving the vehicle 78 along straight path 80, adjustable bracket 62 may be coupled to tie rod 22. In some embodiments, it may be necessary and/or beneficial to perform these steps in the opposite order. For example, adjustable bracket 62 may be coupled to tie rod 22 before coupling fixed bracket assembly 36 to fixed component 12. Stabilizer fasteners 64 may then be loosened to provide freedom of movement between adjustable bracket 62 and stabilizer bracket 58. As such, the steering of vehicle 78, as shown in FIG. 4C, may be slightly adjusted while allowing steering stabilizer 34 to remain in the centered position while wheels 18, 20 are adjusted to drive vehicle 78 along straight path 80. The process described here allows the centered position of the steering stabilizer 34 and the centered position of the steering assembly 14 of vehicle 78 to align by allowing adjustable bracket 62 to move with tie rod 22 movement relative to stabilizer bracket 58.

In some embodiments straight path 80 is provided within a tolerance that allows vehicle 78 to move in a substantially straight path. In some embodiments, substantially straight path is indicative of no, or minimal, pulling or pushing on tie rod 22 by adjustable steering stabilizer assembly 10 resulting vehicle 78 to not turn while no input is provided by the driver of vehicle 78. For example, a distance of 10, 20, 50, and up to and beyond 100 feet before vehicle 78 veers from straight may represent a tolerance for substantially straight. In some embodiments, substantially straight may be defined by a manufacturer as straight within a specified tolerance.

Once the vehicle 78 is moving along the straight path 80, stabilizer fasteners 64 may be tightened to secure steering stabilizer assembly 10 in the neutral position. Vehicle 78 may be stopped, and the mechanic may tighten stabilizer fasteners 64 by hand or, in some embodiments, stabilizer fasteners 64 may be tightened while vehicle 78 is in motion. For example, an electromechanical actuator can be provided on adjustable bracket assembly 32. The electromechanical actuator may be configured to actuate stabilizing fasteners 64 to secure adjustable bracket 58 in place when the neutral position is achieved. The electromechanical actuator may be actuated by wireless or wired communication from the driver of vehicle 78 or a nearby mechanic. Furthermore, the electromechanical actuator may be used while the vehicle 78 is in motion of stopped. Any method of actuating stabilizer fasteners 64 while vehicle 78 is stopped or in motion may be imagined.

FIGS. 4A and 4B show an exemplary range of movement between stabilizer bracket 58 and adjustable bracket 62. As shown, FIG. 4A depicts the full allowance of motion between stabilizer bracket 58 and adjustable bracket 62 while steering the vehicle wheels 18, 20 to the driver's side while FIG. 4B shows the allowance while steering the vehicle wheels 18, 20 to the passenger side. Ideally, vehicle 78 will follow straight path 80 when stabilizer fasteners 64 are positioned between the two arrangements shown in FIGS. 4A and 4B. If vehicle 78 is pulled in either direction with stabilizer fasteners 64 working against the ends of adjustable slots 68, adjustable bracket assembly 32 may need to be decoupled from tie rod 22 and reset.

After aligned, stabilizer fasteners 64 can be secured such that the centered position of steering stabilizer 34 is provided when the wheels 18, 20 of vehicle 78 are straight and vehicle 78 follows straight path 80. Providing the centered position of steering stabilizer 34 when wheels 18, 20 of vehicle 78 are straight allows steering stabilizer 34 to provide resistance to tie rod 22 during any steering away from straight, thus damping any instability or looseness in steering assembly 14 of the vehicle 78 and providing a centering force. As described above, the centering force provided by first shock absorber 28 and second shock absorber 30 of steering stabilizer 34 forces wheels 18, 20 to follow straight path 80 when the driver of vehicle 78 provides no input to the steering assembly 14. The adjustable steering stabilizer assembly mount and calibration process is described in detailed steps below.

FIG. 5 depicts an exemplary flow diagram illustrating a process of mounting and calibrating adjustable steering stabilizer assembly 10 to vehicle 78 referenced herein by referenced numeral 500. At step 502, fixed bracket assembly 36 may be coupled to vehicle 78. In some embodiments, fixed bracket assembly 36 may be coupled to fixed component 12 such as, for example, the frame, axle 16, or any other structural component of vehicle 78. Fixed bracket assembly 36 may be coupled to tie rod 22 as described in embodiments above and as shown in FIGS. 2D-2E. Fixed bracket assembly 36 may be secured to vehicle 78 by fixed end couplers, which, in some embodiments, may comprise bolts, nuts, screws, adhesives, welding, clamps, or any other method of securely fastening fixed bracket assembly 36 to fixed component 12 of vehicle 78. In some embodiments, step 506, securing adjustable bracket 62 to tie rod 22 (or fixed component 12) may be performed at step 502, and securing fixed bracket assembly 36 to vehicle 78 may be performed at step 506.

At step 504, vehicle wheels 18, 20 are straightened. Here, vehicle wheels 18, 20 may be straightened as accurately as possible with fine tuning described below. Vehicle wheels 18, 20 may be aligned by machine or simply by visual inspection to determine if the wheels are straight. Once it is determined that wheels are somewhat straight, adjustable end 24 of adjustable steering stabilizer assembly 10 may be attached to tie rod 22 of vehicle 78. Here, adjustable bracket 62 may be coupled to tie rod 22 by tie rod fasteners 66 at step 506. Alternatively, adjustable bracket 62 may be coupled to fixed component 12 as described above. In some embodiments, tie rod fasteners 66 may be U-bolts as shown in FIG. 1-2C and 3B; however, tie rod fasteners 66 may be any bolts, screws, clamps, or any other fastener that may couple adjustable bracket 62 to tie rod 22.

At step 508, stabilizer fasteners 64 may be loosened. In some embodiments, stabilizer fasteners 64 may be tightened down securing stabilizer bracket 58 to adjustable bracket 62 before fixed bracket assembly 36 and adjustable bracket assembly 32 are secured to vehicle 78. Therefore, prior to adjusting, or fine tuning, adjustable bracket assembly 32, stabilizer fasteners 64 may be loosened. Loosening stabilizer fasteners 64 allows stabilizer fasteners 64 to slide within adjustable slots 68 while still coupling stabilizer bracket 58 to adjustable bracket 62. Therefore, when tie rod 22 moves do to steering adjustments of steering assembly 14, adjustable bracket 62 can move relative to stabilizer bracket 58 and therefore, relative to steering stabilizer 34. Furthermore, stabilizer fasteners 64 may be slightly modified from typical fasteners used for similar purposes. As shown in FIGS. 3A and 3B and as described above, stabilizer fasteners 64 may be bolts. The bolts may be, in some embodiments, an extra ¼, ½, ¾, 1 inch or any other length beyond the typical length for bolts of similar or same purposes. The bolts may be extra long to provide space for the nuts and washers to be securely attached to the bolt while allowing the bolts to slide along adjustable slots 68. Therefore, while vehicle 78 is in motion, adjustable steering stabilizer assembly 10 may be secured to tie rod 22 by adjustable bracket assembly 32 and at fixed component 12 of vehicle 78 and steering stabilizer 34 remains adjustable because adjustable bracket 62 is loosely attached stabilizer bracket 58.

At step 510, vehicle 78 may be driven along straight path 80 and steering wheels 18, 20 further adjusted to verify that the wheels 18, 20 are straight (i.e., centered) as described above. As vehicle 78 is driven, the steering assembly 14 may be adjusted such that vehicle 78 drives along straight path 80. The alignment here may be slightly different than the alignment that was calibrated in step 504 above. Therefore, tie rod 22 may be in a different position than was previously established in step 504. Accordingly, adjustable bracket 62, coupled to tie rod 22, may be in a different position than was previously established such that stabilizer fasteners 64 have now slid within adjustable slots 68 as steering stabilizer 34, coupled to fixed bracket assembly 36, remained in the centered position while adjustable bracket 62 moved. At this point, steering stabilizer 34 and steering assembly 14 of vehicle 78 are centered.

At step 512, stabilizer fasteners 64 can be tightened. Now that steering stabilizer 34 and steering assembly 14 of vehicle 78 are centered, vehicle 78 can be stopped, and stabilizer fasteners 64 can be tightened. In some embodiments, stabilizer fasteners 64 can be tightened while vehicle 78 is moving if an electromechanical actuator is attached to adjustable bracket assembly 32 as described above. Once stabilizer fasteners 64 are tightened, steering stabilizer 34 is locked into place and is configured to be at or near the center position when the steering assembly 14 of vehicle 78 follows straight path 80.

At step 514, steering stabilizer assembly may be tested and readjusted if needed. As described above, if it is not possible to drive vehicle 78 along straight path 80 with stabilizer fasteners 64 in adjustable slots 68 without pulling to one side or the other, adjustable bracket 62 may be decoupled from tie rod 22 and reset for the fine tuning and calibration process.

In some aspects, the techniques described herein relate to a method of installing a steering stabilizer assembly on a vehicle, the method including: coupling a fixed bracket to a fixed component of the vehicle; coupling an adjustable bracket to a tie rod of the vehicle, wherein the adjustable bracket is coupled to a stabilizer bracket by stabilizer fasteners; providing a steering stabilizer between the stabilizer bracket and the fixed bracket, wherein the steering stabilizer includes one or more shock absorbers configured to absorb energy from the vehicle; adjusting the adjustable bracket relative to the stabilizer bracket by moving the tie rod and allowing the stabilizer fasteners to move in fastener slots while the vehicle is in motion; and tightening the stabilizer fasteners when a steering assembly of the vehicle is in a steering center position that steers the vehicle in a substantially straight path and the steering stabilizer is in a stabilizer center position.

In some aspects, the techniques described herein relate to a method, wherein the adjustable bracket is configured to couple to the tie rod at a selectable position along a length of the tie rod.

In some aspects, the techniques described herein relate to a method, wherein the one or more shock absorbers includes a first shock absorber and a second shock absorber, wherein the first shock absorber and the second shock absorber are arranged along a length of the steering stabilizer and configured to center the tie rod when no input is provided by a driver.

In some aspects, the techniques described herein relate to a method, wherein the one or more shock absorbers include gas pull-type and gas push-type springs.

In some aspects, the techniques described herein relate to a method, wherein the stabilizer center position includes equal and opposite pushing and pulling forces on the steering stabilizer.

In some aspects, the techniques described herein relate to a method, wherein the energy from the vehicle is transferred from the tie rod through the adjustable bracket to the steering stabilizer.

In some aspects, the techniques described herein relate to a method, wherein the fixed bracket is coupled to a frame or an axle of the vehicle.

In some aspects, the techniques described herein relate to a steering stabilizer assembly including: an adjustable bracket coupled to a tie rod of a vehicle, wherein the adjustable bracket includes fastener slots configured to receive fasteners; a fixed bracket coupled to a fixed component of the vehicle; a steering stabilizer including one or more shock absorbers configured to absorb energy imparted to the steering stabilizer by the vehicle; a stabilizer bracket positioned between the steering stabilizer and the adjustable bracket; stabilizer fasteners disposed in the fastener slots coupling the stabilizer bracket to the adjustable bracket; wherein the adjustable bracket is configured to move relative to the stabilizer bracket by moving the tie rod and allowing the stabilizer fasteners to move in the fastener slots; and wherein the stabilizer fasteners are configured to be tightened, locking the adjustable bracket and the stabilizer bracket together when the tie rod is in a steering center position that steers the vehicle in a substantially straight path and the steering stabilizer is in a stabilizer center position.

In some aspects, the techniques described herein relate to a steering stabilizer assembly, wherein the adjustable bracket is configured to couple to the tie rod at a selectable position along a length of the tie rod.

In some aspects, the techniques described herein relate to a steering stabilizer assembly, wherein the one or more shock absorbers includes a first shock absorber and a second shock absorber, and wherein the first shock absorber and the second shock absorber are arranged along a length of the steering stabilizer and configured to provide a centering force to a steering assembly of the vehicle.

In some aspects, the techniques described herein relate to a steering stabilizer assembly, wherein the stabilizer center position includes equal and opposite pushing and pulling forces on the steering stabilizer.

In some aspects, the techniques described herein relate to a steering stabilizer assembly, wherein the energy from the vehicle is transferred from the tie rod through the adjustable bracket to the first shock absorber and the second shock absorber of the steering stabilizer.

In some aspects, the techniques described herein relate to a steering stabilizer assembly, wherein the fixed bracket is coupled to a frame or an axle of the vehicle.

In some aspects, the techniques described herein relate to a steering stabilizer assembly including: an adjustable bracket coupled to a tie rod of a vehicle, wherein the adjustable bracket includes fastener slots configured to receive fasteners; a fixed bracket coupled to a fixed component of the vehicle; a steering stabilizer including one or more shock absorbers configured to absorb energy imparted to the steering stabilizer by the vehicle; a stabilizer bracket positioned between the steering stabilizer and the adjustable bracket; stabilizer fasteners disposed in the fastener slots coupling the stabilizer bracket to the adjustable bracket; wherein the adjustable bracket is configured to move relative to the stabilizer bracket by moving the tie rod and allowing the stabilizer fasteners to move in the fastener slots based on a stabilizer center position of the steering stabilizer, wherein the stabilizer center position provides a centering force to a steering assembly of the vehicle; and wherein the stabilizer fasteners are configured to be tightened, locking the adjustable bracket and the stabilizer bracket together when the tie rod is in a steering center position that steers the vehicle in a substantially straight path and the steering stabilizer is in the stabilizer center position.

In some aspects, the techniques described herein relate to a steering stabilizer assembly, wherein the adjustable bracket is configured to couple to the tie rod at a selectable position along a length of the tie rod.

In some aspects, the techniques described herein relate to a steering stabilizer assembly, wherein the one or more shock absorbers includes a first shock absorber and a second shock absorber, and wherein the first shock absorber and the second shock absorber are arranged along a length of the steering stabilizer and configured to provide pushing and pulling forces on the tie rod.

In some aspects, the techniques described herein relate to a steering stabilizer assembly, wherein the one or more shock absorbers include gas pull-type and gas push-type springs.

In some aspects, the techniques described herein relate to a steering stabilizer assembly, wherein the energy from the vehicle is transferred from the tie rod through the adjustable bracket to the first shock absorber and the second shock absorber of the steering stabilizer.

In some aspects, the techniques described herein relate to a steering stabilizer assembly, wherein the fixed bracket is coupled to a frame or an axle of the vehicle.

In some aspects, the techniques described herein relate to a steering stabilizer assembly, wherein the fixed bracket is coupled to a frame or an axle of the vehicle.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

1. An adjustable bracket assembly comprising:
- an adjustable bracket comprising one or more adjustable fastener slots and one or more fastener slots;
- one or more fasteners configured to couple the adjustable bracket to a tie rod by the one or more fastener slots;
- one or more stabilizer fasteners configured to couple the adjustable bracket to a steering stabilizer by the one or more adjustable fastener slots,
- wherein the steering stabilizer is positioned between the tie rod and a fixed component of a vehicle,
- wherein the one or more adjustable fastener slots are configured with an elongated slot length in line with the steering stabilizer allowing the adjustable bracket to move relative to the steering stabilizer while coupled to the steering stabilizer by the one or more stabilizer fasteners in a loose configuration; and
- wherein the one or more stabilizer fasteners are configured to be tightened, locking the adjustable bracket relative to the steering stabilizer.

2. The adjustable bracket assembly of claim 1,
- wherein the one or more fasteners is one or more U-bolts configured to couple the adjustable bracket to the tie rod.

3. The adjustable bracket assembly of claim 1, wherein the one or more fasteners are bolts configured to couple the adjustable bracket to the tie rod.

4. The adjustable bracket assembly of claim 1,
- wherein the one or more stabilizer fasteners are bolts, and
- wherein the one or more adjustable fastener slots are configured to receive the bolts therethrough and allow the bolts to slide laterally within the one or more adjustable fastener slots while the bolts are secured in the one or more adjustable fastener slots.

5. The adjustable bracket assembly of claim 1, further comprising a stabilizer bracket configured to couple to the adjustable bracket between the adjustable bracket and the steering stabilizer.

6. The adjustable bracket assembly of claim 5, wherein the stabilizer bracket comprises stabilizer holes configured to receive the one or more stabilizer fasteners for coupling the stabilizer bracket to the adjustable bracket.

7. The adjustable bracket assembly of claim 6, wherein the stabilizer bracket is configured to be coupled to and moveable relative to the adjustable bracket when the one or more stabilizer fasteners are in the loose configuration, and wherein the stabilizer bracket is configured to be secured to and immoveable relative to the adjustable bracket when the one or more stabilizer fasteners are tightened.

8. An adjustable bracket assembly comprising:
- an adjustable bracket comprising one or more adjustable fastener slots and one or more fastener slots;
- one or more U-bolts configured to couple the adjustable bracket to a vehicle tie rod by the one or more fastener slots;
- one or more stabilizer fasteners configured to couple the adjustable bracket to a steering stabilizer by the one or more adjustable fastener slots,
- wherein the one or more adjustable fastener slots are configured with an elongated slot length in line with the steering stabilizer allowing the adjustable bracket to move relative to the steering stabilizer while coupled to the steering stabilizer by the one or more stabilizer fasteners in a loose configuration; and
- wherein the one or more stabilizer fasteners are configured to be tightened, locking the adjustable bracket relative to the steering stabilizer.

9. The adjustable bracket assembly of claim 8, wherein the one or more adjustable fastener slots are configured to receive the one or more stabilizer fasteners therethrough and allow the one or more stabilizer fasteners to slide laterally within the one or more adjustable fastener slots while the one or more stabilizer fasteners are secured in the one or more adjustable fastener slots.

10. The adjustable bracket assembly of claim 8, further comprising a stabilizer bracket configured to couple to the adjustable bracket between the adjustable bracket and the steering stabilizer.

11. The adjustable bracket assembly of claim 10, wherein the stabilizer bracket comprises stabilizer holes configured to receive the one or more stabilizer fasteners for coupling the stabilizer bracket to the adjustable bracket.

12. The adjustable bracket assembly of claim 11, wherein the stabilizer bracket is configured to be coupled to and moveable relative to the adjustable bracket when the one or more stabilizer fasteners are in the loose configuration, and wherein the stabilizer bracket is configured to be secured to and immoveable relative to the adjustable bracket when the one or more stabilizer fasteners are tightened.

13. The adjustable bracket assembly of claim 12, wherein the stabilizer bracket is configured to couple to the steering stabilizer and allow at least one degree of rotational freedom to the steering stabilizer when coupled.

14. An adjustable bracket assembly comprising:
- an adjustable bracket comprising at least two adjustable fastener slots and one or more fastener slots;
- one or more fasteners configured to couple the adjustable bracket to a fixed component of a vehicle by the one or more fastener slots;

one or more stabilizer fasteners configured to couple the adjustable bracket to a steering stabilizer by the at least two adjustable fastener slots, wherein the steering stabilizer is positioned between the fixed component of the vehicle and a tie rod, wherein each adjustable fastener slot of the at least two adjustable fastener slots are configured with elongated slot lengths in line with the steering stabilizer allowing the adjustable bracket to move in line with and relative to the steering stabilizer while coupled to the steering stabilizer by the one or more stabilizer fasteners in a loose configuration; and wherein the one or more stabilizer fasteners are configured to be tightened, locking the adjustable bracket relative to the steering stabilizer.

15. The adjustable bracket assembly of claim 14, wherein the one or more fasteners are bolts configured to couple the adjustable bracket to the fixed component.

16. The adjustable bracket assembly of claim 14, wherein the one or more stabilizer fasteners are bolts, and wherein the at least two adjustable fastener slots are configured to receive the bolts therethrough and allow the bolts to slide along the elongated slot lengths within the at least two adjustable fastener slots while the bolts are secured in the at least two adjustable fastener slots.

17. The adjustable bracket assembly of claim 16, further comprising a stabilizer bracket configured to couple to the adjustable bracket between the adjustable bracket and the steering stabilizer.

18. The adjustable bracket assembly of claim 17, wherein the stabilizer bracket comprises stabilizer holes configured to receive the bolts for coupling the stabilizer bracket to the adjustable bracket.

19. The adjustable bracket assembly of claim 18, wherein the stabilizer bracket is configured to be coupled to and moveable relative to the adjustable bracket when the bolts are in the loose configuration, and wherein the stabilizer bracket is configured to be secured to and immoveable relative to the adjustable bracket when the bolts are tightened.

20. The adjustable bracket assembly of claim 19, wherein the stabilizer bracket is configured to couple to the steering stabilizer and allow at least one degree of rotational freedom to the steering stabilizer when coupled.

* * * * *